(12) United States Patent
Dudar et al.

(10) Patent No.: US 10,076,937 B2
(45) Date of Patent: Sep. 18, 2018

(54) VEHICLE TOW CAPACITY ESTIMATOR

(71) Applicant: Ford Global Technologies, LLC, Dearborn, MI (US)

(72) Inventors: Aed M Dudar, Canton, MI (US); Mahmoud Yousef Ghannam, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 64 days.

(21) Appl. No.: 15/265,443

(22) Filed: Sep. 14, 2016

(65) Prior Publication Data
US 2018/0072118 A1 Mar. 15, 2018

(51) Int. Cl.
 B60D 1/24 (2006.01)
 B60D 1/62 (2006.01)
 G01C 21/34 (2006.01)
 G01G 19/12 (2006.01)
(52) U.S. Cl.
 CPC ............... B60D 1/248 (2013.01); B60D 1/62 (2013.01); G01C 21/3415 (2013.01); G01G 19/12 (2013.01)
(58) Field of Classification Search
 CPC .......... B60D 1/248; B60D 1/62; G01G 19/12; G01C 21/3415
 See application file for complete search history.

(56) References Cited

U.S. PATENT DOCUMENTS

| | | | |
|---|---|---|---|
| 5,760,713 A | 6/1998 | Yokoyama et al. | |
| 6,829,943 B2 | 12/2004 | Weyand et al. | |
| 8,589,045 B2 | 11/2013 | Seymour et al. | |
| 9,290,185 B2 | 3/2016 | Hall | |
| 2013/0253814 A1* | 9/2013 | Wirthlin | G01G 19/02 701/124 |
| 2014/0222330 A1 | 8/2014 | Kohlenberg et al. | |

FOREIGN PATENT DOCUMENTS

| | | |
|---|---|---|
| EP | 2441595 | 4/2012 |
| GB | 2548000 | 9/1917 |
| GB | 2518857 | 8/2015 |
| WO | WO 2015004639 | 1/2015 |

OTHER PUBLICATIONS

Search Report dated Feb. 28, 2018 for GB Patent Application No. GB1714676.2 (3 Pages).

* cited by examiner

*Primary Examiner* — Rodney Allen Butler
(74) *Attorney, Agent, or Firm* — James P. Muraff; Neal, Gerber & Eisenberg LLP

(57) ABSTRACT

Apparatus and methods are disclosed for a vehicle tow capacity estimator. An example disclosed vehicle includes memory and a processor. The example memory stores first and second acceleration profiles and a degradation factor table. The example processor, when a load is connected to the vehicle, determines a third acceleration profile and calculates a tow capacity ratio based on the first, second, and third acceleration profile, and a degradation factor. Additionally, the example processor, in response to the tow capacity ratio not satisfying a tow threshold, provides a warning.

9 Claims, 4 Drawing Sheets

VEHICLE TOW CAPACITY ESTIMATOR

TECHNICAL FIELD

The present disclosure generally relates to vehicle navigation and, more specifically, a vehicle tow capacity estimator.

BACKGROUND

Many vehicles have a hitch attached to the frame of the vehicle to allow customers to tow a range of loads, such as trailers, boats, and recreational vehicles, etc. Trucks often have hitches. Additionally, some cars and sports utility vehicles also have options for a towing package. The cars usually cannot tow as much as the trucks. Furthermore, the grade of the road may change over the route the car is towing the load. As a result, a customer may begin a trip by towing a load that is in excess of the vehicle's ability over the route on which the vehicle is traveling. This can result in undesirable scenarios such as overheating engine, transmission damage, interrupted vacation trip.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Apparatus and methods are disclosed for a vehicle tow capacity estimator. An example disclosed vehicle includes memory and a processor. The example memory stores first and second acceleration profiles and a degradation factor table. The example processor, when a load is connected to the vehicle, determines a third acceleration profile and calculates a tow capacity ratio based on the first, second, and third acceleration profile, and a degradation factor. Additionally, the example processor, in response to the tow capacity ratio not satisfying a tow threshold, provides a warning.

An example method to protect a powertrain of a vehicle includes, when a load is connected to the vehicle, determining a first acceleration profile and calculating a tow capacity ratio based on the first acceleration profile, a second acceleration profile, a third acceleration profile, and a degradation factor. The second and third acceleration profiles are stored in memory. The example method also includes, in response to the tow capacity ratio not satisfying a tow threshold, providing a warning.

An example tangible computer readable medium comprising instructions that, when executed, cause a vehicle to, when a load is connected to the vehicle, determine a first acceleration profile and calculate a tow capacity ratio based on the first acceleration profile, a second acceleration profile, a third acceleration profile, and a degradation factor. The second and third acceleration profiles are stored in memory. Additionally, the instructions cause the vehicle to, in response to the tow capacity ratio not satisfying a tow threshold, provide a warning.

BRIEF DESCRIPTION OF THE DRAWINGS

For a better understanding of the invention, reference may be made to embodiments shown in the following drawings.

The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
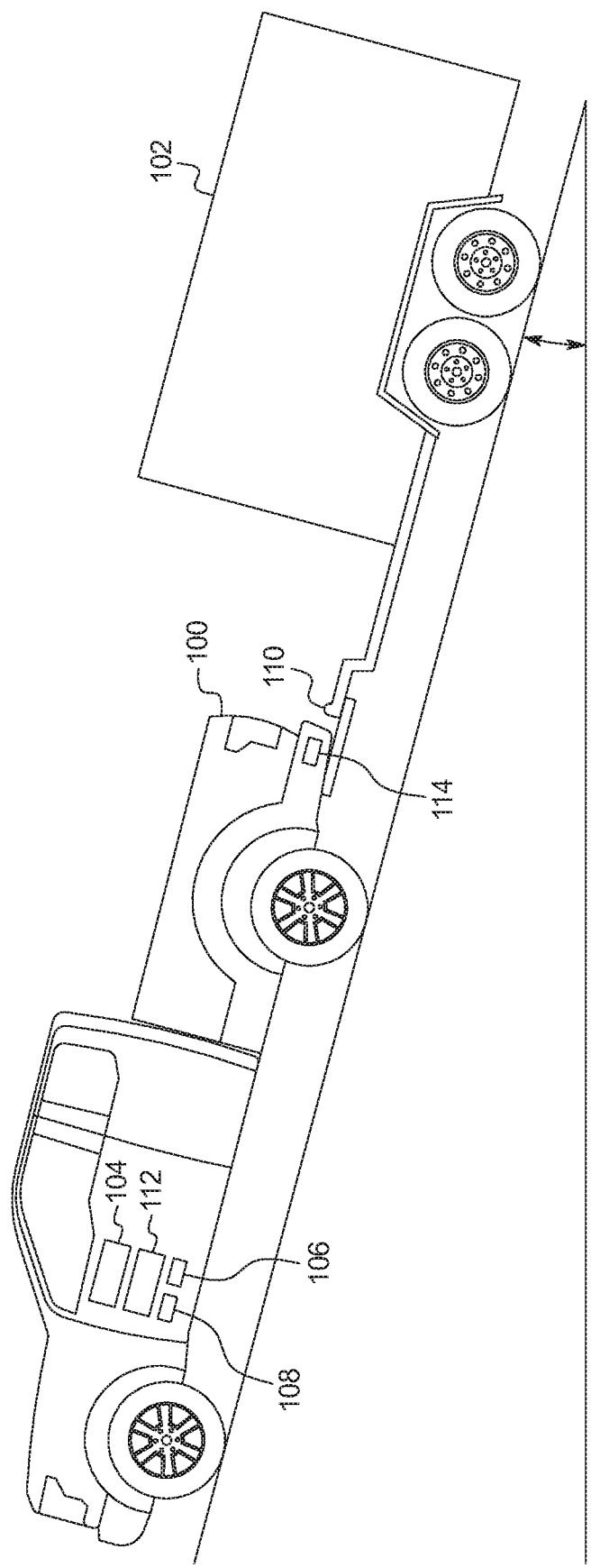
FIG. 1 illustrated a vehicle towing a load in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

The tow capacity of a vehicle varies from powertrain to powertrain. Additionally, the tow capacity of the vehicle may change overtime. For example, a vehicle's towing capacity may degrade as various part of the vehicle age, such as the engine and/or the tires. As another example, some events, such as oil changes, engine tunings, installing new tires, etc., may improve the vehicle's towing capacity. Further, the vehicle's towing capacity changes based on a slope of the route on which the vehicle will be driven. As such, a driver can have problems determining the vehicle's tow capacity and estimate the weight of the load being towed.

As used herein, a slope of a road is measured in (a) an angle of inclination compared to the horizon or (b) a grade. The grade is a hundred times the tangent of the angle of inclination compared to the horizon. The slope may be upwards (the angle of inclination and the grade are positive), downwards (the angle of inclination and the grade are negative), or flat (e.g. the angle of inclination and the grade are zero). For example, the grade of Eisenhower Pass in Colorado, traveling west, is 6%. As the slope of a road increases, the tow capacity required to tow the load increases. Thus, a vehicle may be initially able to tow a load, but cannot once the slope of the road increases. As a result, the driver may begin to travel a route only to later discover that the degradation in the tow capacity over the route results in the vehicle not capable of towing the load in the middle of the route.

As disclosed below, a tow estimator estimates the two capacity of the vehicle over the route and provides a warning if the vehicle does not have enough tow capacity to complete the route. From time to time (e.g., after period of time, after a set number of miles, after a maintenance event, etc.), the tow estimator establishes a baseline tow capacity based on the average acceleration of the vehicle without the load while traversing a flat road. When the vehicle detects that the load is connected to the vehicle (e.g., via a hitch sensor, via a rear camera, etc.), the vehicle determines the weight of the load based on the average acceleration of the vehicle the load while traversing the flat road. The tow estimator analyzes road segments of a route to determine the maximum road grade on the route. As used herein, a road segment is a contiguous section of a road that has common characteristics (e.g., lane configurations, speed limit, elevation, slope, curvature, etc.). For example, a road segment may represent a portion of a highway with a substantially similar slope (e.g., ±0.5 percent grade, etc.). The tow estimator estimates the tow capacity of the vehicle with a degradation factor based on maximum road grade on the route. The degradation factor takes into account increased work to tow a load up roads with positive slopes. In some examples, a test vehicle may be driven on two inclines, such as one percent and six percent. The degradation factor is the difference in acceleration at the same throttle angle. In some such examples, a linear relationship is assumed to create a degradation factor table through interpolation.

To determine whether towing the load over the route is advisable, the tow estimator compares the degraded tow capacity to the estimated weight of the load. In some examples, the two estimator provides an alert if a ratio of the estimated weight of the load and the degraded tow capacity satisfies (e.g., is greater than or equal to) a towing threshold. In some such examples, the towing threshold is 80 percent. In some examples, the tow estimator determines whether another route to the destination exists on which the ratio of the estimated weight of the load and the degraded tow capacity satisfies the towing threshold. In such examples, the tow estimator recommends the alternate route. As a result, the tow estimator provides guidance of the actual tow capacity of the vehicle.

FIG. 1 illustrated a vehicle 100 (e.g., a truck, a semi-trailer truck, a car, a van, a sport utility vehicle, etc.) towing a load 102 (e.g., a trailer, a board, a recreational vehicle, etc.) in accordance with the teachings of this disclosure. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The performance of the powertrain varies as parts of the powertrain wear over time, are replaced, and/or receive maintenance. The performance of the powertrain is a factor that determines a tow capacity of the vehicle 100. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example the vehicle 100 includes an infotainment head unit 104, sensors 106 and 108, a hitch 110, and a tow estimator 112.

The infotainment head unit 104 provides an interface between the vehicle 100 and a user (e.g., the driver). The infotainment head unit 104 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display ("LCD"), an organic light emitting diode ("OLED") display, a flat panel display, a solid state display, etc.), and/or speakers. The example infotainment head unit 104 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). Additionally, the infotainment head unit 104 displays the infotainment system on, for example, the center console display. In some examples, the infotainment system includes a navigation application that provides road segment data (e.g., slopes of the road segments, curvature of the road, speed limits, etc.). Additionally or alternatively, the infotainment system may include an application that provides horizon data with topology information (such as, turn angles, road gradients, road features (e.g. tunnels, bridges, etc.), etc.), position information (e.g., coordinates from the GPS) and road information (such as speed limits, surface material, etc.) about the roads in the vicinity of the vehicle 100.

The sensors 106 and 108 may be arranged in and around the vehicle 100 in any suitable fashion. In the illustrated example, the sensors include a yaw and pitch sensor 106 and a speed sensor 108. The yaw and pitch sensor 106 measures the inclination of the vehicle 100. For example, the tow estimator 112, via the yaw and pitch sensor 106 determines when the vehicle 100 is on a flat road. The speed sensor 108 may be a wheel speed sensor or a driveshaft sensor. The speed sensor 108 provides the speed of the vehicle 100.

The hitch 110 that allows the load 102 to be physically coupled to the vehicle 100. The hitch 110 includes a hitch connector 114 that facilitates the detecting when the load 102 is physically coupled to the vehicle 100. Additionally, in some examples, the hitch connector 114 facilitates the load 102 being communicatively coupled to a vehicle data bus (e.g., the vehicle data bus of FIG. 3 below) of the vehicle 100. When the load 102 is connected to the vehicle data bus via the hitch connector 114, the vehicle 100 can control the systems of the load 102, such as lights, brakes, and stability control, etc. Alternatively or additionally, in some examples, the vehicle 100 includes a camera to detect the presence of the load 102.

As disclosed in more detail in FIG. 2 below, the tow estimator 112 determines whether the tow capacity of the vehicle 100 is sufficient to tow the load 102 via a particular route to a destination. To determine the sufficiency of the tow capacity, the tow estimator 112 determines a baseline acceleration profile ($AP_{BASE}$) of the vehicle 100. The tow estimator 112 determines the baseline acceleration profile of the vehicle 100 from time-to-time. In some examples, the tow estimator 112 determines the baseline acceleration profile based on (i) mileage (e.g., every 10,000 miles, every 50,000 miles, etc.), (ii) timing (e.g., monthly, weekly, yearly. etc.), and/or (iii) in response to a maintenance event (e.g., an oil change, a engine tuning, a tire rotation, etc.) The baseline acceleration profile is based on the average acceleration of the vehicle 100 on a flat surface. In some examples, the tow estimator 112 determines the acceleration of the vehicle 100, from a stop, over a period of time (e.g., a day, a week, etc.).

Additionally, the tow estimator 112 includes (a) an unloaded acceleration profile of the vehicle 100 when the vehicle 100 is manufactured (sometimes referred to herein as a "manufacture acceleration profile" ($AP_{MAN}$)) and (b) a manufacture maximum acceleration profile ($AP_{MMAX}$) of the vehicle 100 when the vehicle is manufactured. The manufacture maximum acceleration profile ($AP_{MMAX}$) measures the acceleration profile of the vehicle 100 when the vehicle is towing at its maximum tow capacity. In some examples, the manufacture acceleration profile ($AP_{MAN}$) and the manufacture maximum acceleration profile ($AP_{MMAX}$) are determined during a text process via, for example, a post-manufacture test on dynamometers. The tow estimator 112 detects when the load 102 is connected to the hitch 110.

When the load 102 is connected to the hitch 110, the tow estimator 112 determines a loaded acceleration profile ($AP_{LOAD}$) for the vehicle 100. In some examples, the tow estimator 112 determines the acceleration of the vehicle 100, from a stop, when the load 102 is connected to the vehicle 100. In some examples, the tow estimator 112, via the infotainment head unit 104, instructs the driver to accelerate from a stop on a flat surface with the load 102 connected.

When a destination is input into the navigation application (e.g., via the infotainment head unit 104), the tow estimator 112 receives road segment information about the route selected by the navigation system. The tow estimator 112 determines the maximum grade of the road segments. The tow estimator 112 determines a degradation factor based on the maximum grade. Based on the manufacture acceleration profile ($AP_{MAN}$), the manufacture maximum acceleration profile ($AP_{MMAX}$), the baseline acceleration profile ($AP_{BASE}$) and/or the loaded acceleration profile ($AP_{LOAD}$), and the degradation factor, the tow estimator 112 determines an actual tow capacity ratio ($R_{ATC}$) for the vehicle 100. If the actual tow capacity ratio ($R_{ATC}$) satisfies (e.g., is greater than or equal to) a tow threshold, the tow estimator 112 indicates via the infotainment head unit 104 (e.g., on the center console display and/or the dashboard display). If the actual tow capacity ratio ($R_{ATC}$) does not satisfy the tow threshold, the tow estimator 112 provides an audio and/or visual warning to the driver (e.g., via the infotainment head unit 104). In some examples, the tow threshold is 0.2. In some examples, when the actual tow capacity ratio ($R_{ATC}$) does not satisfy the tow threshold, the tow estimator 112 calculates an alternative maximum grade for the vehicle 100 towing the load 102 and instructs the navigation application to calculate a route to the destination that has a maximum grade less than or equal to the alternative maximum grade.

Figure 2:
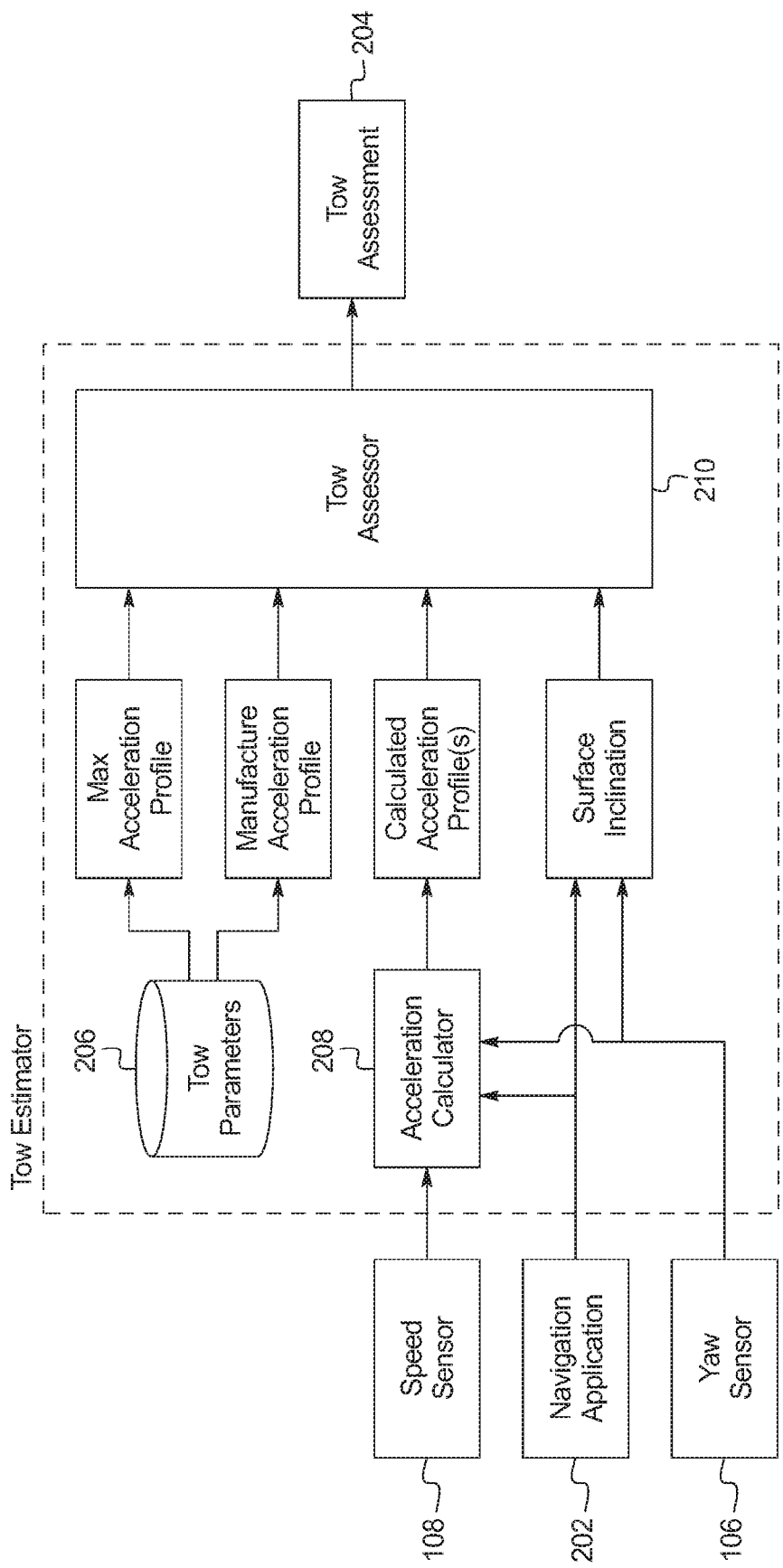
FIG. 2 is a block diagram of the tow manager of FIG. 1.

FIG. 2 is a block diagram of the tow estimator 112 of FIG. 1. In the illustrated example, the tow estimator 112 receives input from the yaw and pitch sensor 106, the speed sensor 108, and a navigation application 202 executing on the infotainment system of the infotainment head unit 104. The tow estimator 112 provides a tow assessment 204 that identifies whether the actual tow capacity ratio ($R_{ATC}$) satisfies the tow threshold. The example tow estimator 112 includes a tow parameters database 206, an acceleration calculator 208, and a tow assessor 210.

The tow parameters database 206 stores the manufacture acceleration profile ($AP_{MAN}$), the manufacture maximum acceleration profile ($AP_{MMAX}$), and the manufacture maximum tow capacity ($T_{MMAX}$) of the vehicle 100 when the vehicle is new. In some examples, the tow parameters database 206 stores the most recently calculated baseline acceleration profile ($AP_{BASE}$). Additionally, the tow parameters database 206 stores a table (e.g., Table 1 below) that associates road grade with degradation factors (DF).

TABLE 1

Example Degradation Factors (DF) associated with Road Grades

| Road Grade | Degradation Factor (DF) |
| --- | --- |
| 1% | 0.9 |
| 2% | 0.8 |
| 3% | 0.7 |
| 4% | 0.6 |
| 5% | 0.5 |
| 6% | 0.4 |

For example, on Table 1 above, if the maximum grade of the road segments on the route is 3 percent, the degradation factor (DF) is 0.7.

The acceleration calculator 208 calculates the baseline acceleration profile ($AP_{BASE}$) and the loaded acceleration profile ($AP_{LOAD}$). The baseline acceleration profile ($AP_{BASE}$) is the average speed as measured by the speed sensor 108 over time a fixed time when (a) the load 102 is not connected to the hitch 110 and (b) the vehicle 100 is on a flat surface. The loaded acceleration profile ($AP_{LOAD}$) is the average speed as measured by the speed sensor 108 over time a fixed time when (a) the load 102 is connected to the hitch 110 and (b) the vehicle 100 is on a flat surface.

The tow assessor 210 calculates the actual tow capacity ratio ($R_{ATC}$). When the load 102 is not connected to the vehicle 100, the tow assessor 210 calculates the actual tow capacity ratio ($R_{ATC}$) with the baseline acceleration profile ($AP_{BASE}$), as shown in Equation 1 below. When the load 102 is connected to the vehicle 100, the tow assessor 210 calculates the actual tow capacity ratio ($R_{ATC}$) with the loaded acceleration profile ($AP_{LOAD}$), as shown in Equation 2 below.

$$R_{ATC\_U} = \left(1 - \frac{ABS(AP_{BASE} - AP_{MAN})}{(AP_{MAN} - AP_{MMAX})}\right) * DF \quad \text{Equation 1}$$

$$R_{ATC\_L} = \left(1 - \frac{ABS(AP_{LOAD} - AP_{MAN})}{(AP_{MAN} - AP_{MMAX})}\right) * DF \quad \text{Equation 2}$$

In Equation 1 above $R_{ATC\_U}$ is the actual tow capacity ratio ($R_{ATC}$) when the vehicle 100 is not connected to the load 102. In Equation 2 above, the $R_{ATC\_L}$ is the actual tow capacity ratio ($R_{ATC}$) when the vehicle 100 is connected to the load 102. In Equation 1 and Equation 2 above, ABS( ) is the absolute value function, and DF is the degradation factor based on the maximum road grade of over the route provided by the navigation application 202. For example, if the baseline acceleration profile ($AP_{BASE}$) is 75, the manufacture acceleration profile ($AP_{MAN}$) is 100, and the manufacture maximum acceleration profile ($AP_{MMAX}$) is 20, and the maximum road grade is 2%, the actual tow capacity ratio ($R_{ATC}$) when the vehicle 100 is not connected to the load 102 is 0.55. As another example, if the loaded acceleration profile ($AP_{LOAD}$) is 40, the manufacture acceleration profile ($AP_{MAN}$) is 100, the manufacture maximum acceleration profile ($AP_{MMAX}$) is 20, and the maximum road grade is 4%, the actual tow capacity ratio ($R_{ATC}$) when the vehicle 100 is connected to the load 102 is 0.15.

When the load 102 is not connected, the tow assessor 210 provides the tow assessment 204 with the current maximum tow capacity ($T_{MAX}$) over the route provided by the navigation application 202, as shown in Equation 3 below.

$$T_{MAX} = T_{MMAX} * R_{ATC\_U} \quad \text{Equation 3}$$

For example, if the manufacture maximum tow capacity ($T_{MMAX}$) is 8,500 pounds (lbs) and the actual tow capacity ratio ($R_{ATC}$) when the vehicle 100 is not connected to the load 102 is 0.55, the current maximum tow capacity ($T_{MAX}$) is 4,675 lbs.

Additionally, when the load 102 is connected to the vehicle 100, the tow assessor 210 compares the actual tow capacity ratio ($R_{ATC}$) to the towing threshold. In some examples, the tow threshold is 0.2. For example, if the tow threshold is 0.2 and the actual tow capacity ratio ($R_{ATC}$) when the vehicle 100 is connected to the load 102 is 0.15, the tow assessor 210 would determine that the actual tow capacity ratio ($R_{ATC}$) does not satisfy the threshold and that the vehicle 100 is not able to tow the load via the route provided by the navigation application 202. When the load 102 is connected to the vehicle, the tow assessment 204 includes (a) instructions for the infotainment head unit 104 to provide an indication of whether the actual tow capacity ratio ($R_{ATC}$) satisfies the towing threshold, and/or (b) instructions for the navigation application 202 to calculate a new route with road segments that have a lower maximum grade.

In some examples, when the actual tow capacity ratio ($R_{ATC}$) does not satisfy the threshold, the tow assessor 210 calculates an alternative maximum road grade to provide to the navigation application 202 to use when recalculating the route. Initially, the tow assessor 210 calculates a maximum degradation factor ($DF_{MAX}$) as shown in Equation 4 below.

$$DF_{MAX} = \frac{Tow\_Threshold}{\left(1 - \frac{ABS(AP_{LOAD} - AP_{MAN})}{(AP_{MAN} - AP_{MMAX})}\right)} \quad \text{Equation 4}$$

In Equation 4 above, the tow_threshold is the tow threshold. For example, if the tow threshold is 0.2, the loaded acceleration profile ($AP_{LOAD}$) is 40, the manufacture acceleration profile ($AP_{MAN}$) is 100, and the manufacture maximum acceleration profile ($AP_{MMAX}$) is 20, the maximum degradation factor ($DF_{MAX}$) is 0.8. The tow assessor 210 then determines the alternative maximum road grade by comparing the maximum degradation factor ($DF_{MAX}$) to the value on Table 1 above and rounds the maximum degradation factor ($DF_{MAX}$) up to the nearest road grade. For example, it the maximum degradation factor ($DF_{MAX}$) is 0.75, the tow assessor rounds up to 0.8. For example if the maximum degradation factor ($DF_{MAX}$) is 0.8, the alternative maximum road grade is 2 percent. In such an example, the tow assessment 204 would include instruction to the navigation application 202 to calculate a route with a maximum road grade of 2 percent.

Figure 3:
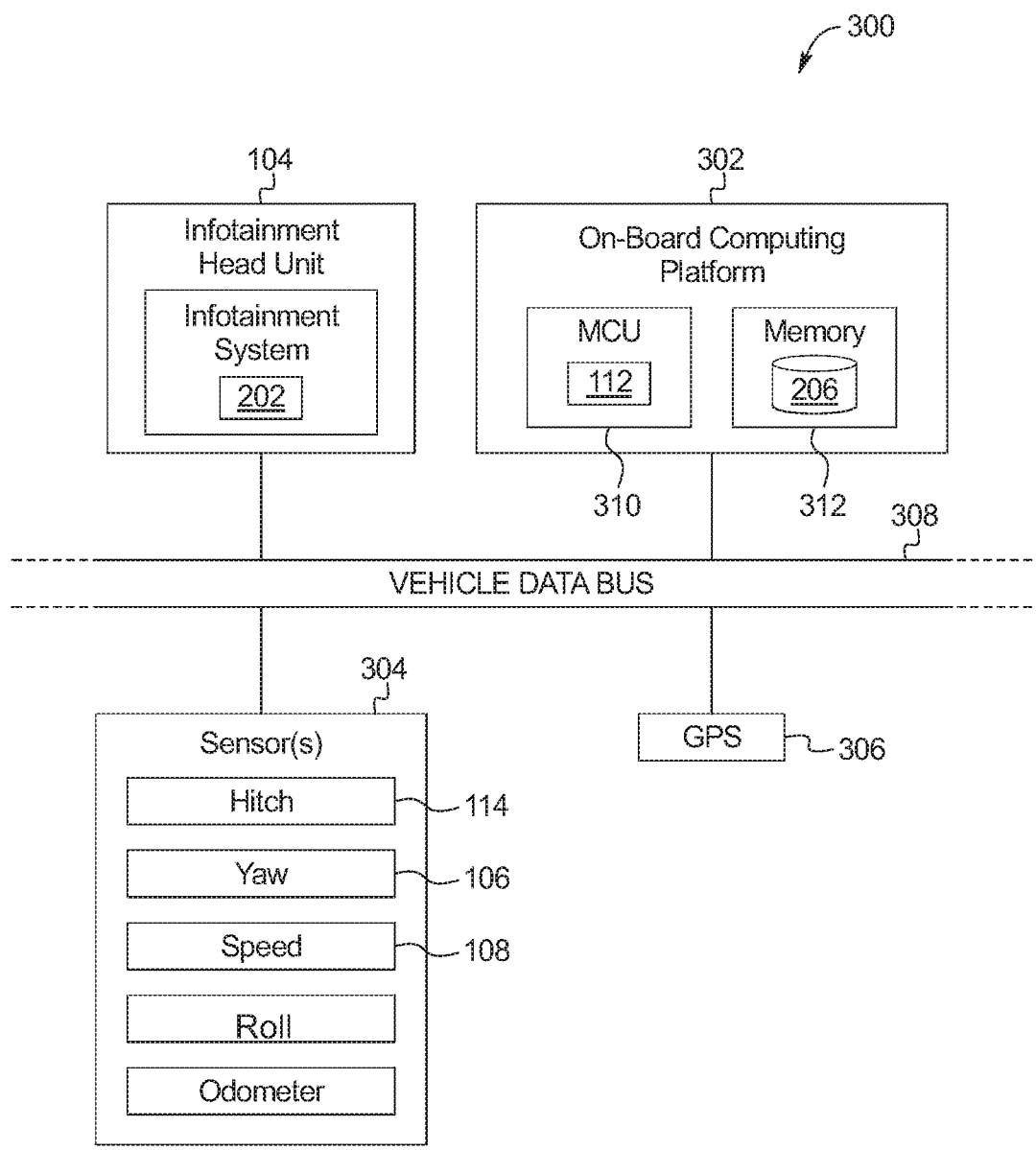
FIG. 3 is a block diagram of the electronic components of the vehicle of FIG. 1.

FIG. 3 is a block diagram of the electronic components 300 of the vehicle 100 of FIG. 1. In the illustrated example, the electronic components 300 include the infotainment head unit 104, an on-board computing platform 302, sensors 304, a global positioning system (GPS) receiver 306, and a vehicle data bus 308.

The on-board computing platform 302 includes a processor or controller 310 and memory 312. In the illustrated example, the on-board computing platform 302 is structured to include tow estimator 112. Alternatively, in some examples, the tow estimator 112 may be incorporated into another electronic control unit (ECU) (e.g., an advanced driving assistance system, etc.) with its own processor and memory. The processor or controller 310 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 312 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 312 includes multiple kinds of memory, particularly volatile memory and non-volatile memory.

The memory 312 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 312, the computer readable medium, and/or within the processor 310 during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The sensors 304 may be mounted to measure properties around the exterior of the vehicle 100. Additionally, some sensors 304 may be mounted inside the cabin of the vehicle 100 or in the body of the vehicle 100 (such as, the engine compartment, the wheel wells, etc.) to measure properties in the interior of the vehicle 100. Some of the sensors 304 may be mounted around the body of the vehicle 100 to monitor the external area around the vehicle 100. For example, the sensors 304 may include accelerometers, odometers, cameras, range detection sensors (e.g., RADAR, LiDAR, ultrasonic, infrared, etc.), tachometers, roll sensors, microphones, tire pressure sensors, and biometric sensors, etc. In the illustrated example, the sensors 304 include the yaw and pitch sensor 106, the speed sensor 108, and the hitch connector 114.

The GPS receiver 306 provides the current coordinates of the vehicle 100. The navigation application 202 uses the coordinates to calculate a route from the current location of the vehicle 100 to the destination input into the navigation application 202. While the term "GPS" is used, the GPS receiver 306 may be compatible with any global navigation satellite system, such as GLONASS, Galileo, and/or Beidou.

The vehicle data bus 308 communicatively couples the infotainment head unit 104, the on-board computing platform 302, the sensors 304, and the GPS receiver 306. In some examples, the vehicle data bus 308 includes one or more data buses. The vehicle data bus 308 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 4:
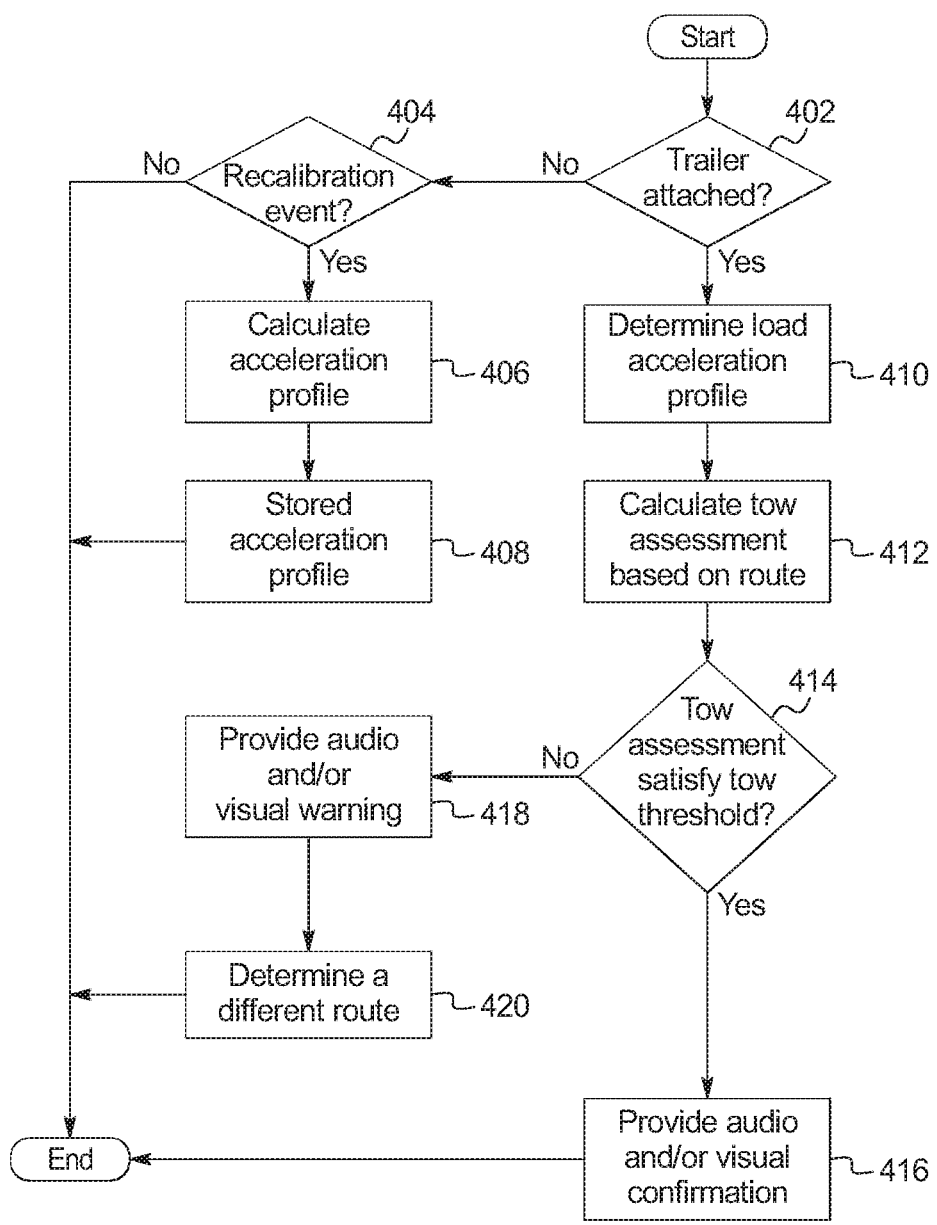
FIG. 4 is a flowchart of a method to estimate the tow capacity of the vehicle of FIG. 1 that may be implemented by the electronic components of FIG. 3.

FIG. 4 is a flowchart of a method to estimate the tow capacity of the vehicle 100 of FIG. 1 that may be implemented by the electronic components 300 of FIG. 3. The method of FIG. 4 begins, for example, when an ignition switch of the vehicle 100 is set into an "ON" position. Initially, at block 402, the tow estimator 112 determines whether the load 102 is attached. The tow estimator 112 determines whether the load 102 is attached via the hitch connector 114 and/or a rear-facing camera. If the load 102 is attached, the method continues to block 410. Otherwise, if the load 102 is not attached, the method continues to block 404.

At block 404, the tow estimator 112 determines whether the vehicle 100 has experienced a recalibration event. In some examples, the recalibration events are based on (a) mileage (e.g., every 2,000 miles, every 5,000 miles, etc.), (b) a period of time (e.g., every six months, every year, etc.), or (c) a maintenance event (e.g., an oil change, a tire relation, engine maintenance, etc.). If a recalibration event has occurred, the method continues at block 406. Otherwise, if a recalibration event has not occurred, the method ends. At block 406, the tow estimator 112 determines the baseline acceleration profile ($AP_{BASE}$). In some examples, the tow estimator 112 (i) takes several (e.g., two, three, etc.) measurements of the acceleration of the vehicle 100 from a zero speed to 40 miles per hour on a flat surface during a driving session, and (ii) averages the measurements. At block 408, the tow estimator 112 stores the baseline acceleration profile ($AP_{BASE}$) in the tow parameters database 206.

At block 410, the tow estimator 112 determines the loaded acceleration profile ($AP_{LOAD}$). In some examples, the tow estimator 112 (i) measures the acceleration of the vehicle 100 from a zero speed to a target speed on a flat surface. In some examples, the tow estimator 112 requests, via the infotainment head unit 104, that the driver accelerate the vehicle 100 to the target speed on the flat surface. In some such examples, the tow estimator 112 may request that the vehicle 100 with the load 102 attached be accelerated several times so that the tow estimator 112 can average the acceleration measurements. At block 412, the tow estimator 112 generates the tow assessment 204 based on the loaded acceleration profile ($AP_{LOAD}$) determines at block 410 and a route calculated by the navigation application 202. In some examples, to generate the tow assessment 204, the tow estimator (a) calculates the actual tow capacity ratio ($R_{ATC}$) in accordance with Equation 2 above, and (b) compares the actual tow capacity ratio ($R_{ATC}$) to the tow threshold.

At block 414, the tow estimator 112 determines whether the actual tow capacity ratio ($R_{ATC}$) satisfies (e.g., is greater than or equal to) the tow threshold. If the actual tow capacity ratio ($R_{ATC}$) satisfies the tow threshold, the method continues at block 416. Otherwise, if the actual tow capacity ratio ($R_{ATC}$) does not satisfy the tow threshold, the method continues at 418. At block 416, the tow estimator 112 provides, via the infotainment head unit 104 an audio and/or visual confirmation that the vehicle 100 can tow the load 102 via the route. At block 418, the tow estimator 112 provides, via the infotainment head unit 104 an audio and/or visual confirmation that the vehicle 100 cannot tow the load 102 via the route. At block 420, the tow estimator 112 instructs the navigation application to 202 to determine a new route to the destination. In some examples, the tow estimator 112 provides an alternate maximum grade to determine the maximum grade that the road segments of the new route may have. In some such examples, the alternate maximum grade is calculated in accordance with Equation 4 above.

The flowchart of FIG. 4 is representative of machine readable instructions stored in memory (such as the memory 312 of FIG. 3) that comprise one or more programs that, when executed by a processor (such as the processor 310 of FIG. 3), cause the vehicle 100 to implement the example tow estimator 112 of FIGS. 1, 2, and 3. Further, although the example program(s) is/are described with reference to the flowchart illustrated in FIG. 4, many other methods of implementing the example tow estimator 112 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a powertrain coupled to a vehicle frame;
   speed sensors;
   memory to store first and second acceleration profiles and a degradation factor table;
   a hitch including a sensor to detect when a load is connector to the vehicle; and
   a processor connected to the sensor of the hitch to, when a load is detected by the sensor of the hitch:
      determine a third acceleration profile based on measurements from the speed sensors;
      calculate a tow capacity ratio of the power train based on the first, second, and third acceleration profile, and a degradation factor from the degradation factor table; and
      in response to the tow capacity ratio not satisfying a tow threshold, provide a warning.

2. The vehicle of claim 1, wherein the first acceleration profile characterizes acceleration of the vehicle without any load, and the second acceleration profile characterizes the acceleration of the vehicle with its maximum load, and wherein the first and second acceleration profiles are determined when the vehicle is manufactured.

3. The vehicle of claim 1, wherein the degradation factor table associates the degradation factors to road grades.

4. The vehicle of claim 1, wherein the third acceleration profile characterizes an acceleration of the vehicle with the load connected.

5. The vehicle of claim 1, wherein to calculate the tow capacity ratio, the processor is to determine a maximum road grade on a route provided by a navigation application, the navigation application providing road segment data specifying grades of road segments that constitute the route.

6. The vehicle of claim 5, wherein the degradation factor is selected from the degradation factor table based on the maximum road grade.

7. The vehicle of claim 1, wherein in response to the tow capacity ratio not satisfying the tow threshold, the processor is to instruct a navigation application to calculate a new route.

8. The vehicle of claim 1, wherein in response to the tow capacity ratio not satisfying the tow threshold, the processor is to:
   determine a maximum road grade that the vehicle can traverse based on the third acceleration profile; and
   instruct a navigation application to calculate a new route with road grades less than or equal to the maximum road grade.

9. The vehicle of claim 1, wherein the tow threshold is 0.20.

\* \* \* \* \*